(12) United States Patent
Dureau

(10) Patent No.: US 7,900,229 B2
(45) Date of Patent: Mar. 1, 2011

(54) CONVERGENCE OF INTERACTIVE TELEVISION AND WIRELESS TECHNOLOGIES

(75) Inventor: Vincent Dureau, Palo Alto, CA (US)

(73) Assignee: OPENTV, Inc., San Francisco, CA (US)

( * ) Notice: Subject to any disclaimer, the term of this patent is extended or adjusted under 35 U.S.C. 154(b) by 947 days.

(21) Appl. No.: 10/271,801

(22) Filed: Oct. 15, 2002

(65) Prior Publication Data

US 2004/0073915 A1   Apr. 15, 2004

(51) Int. Cl.
  *H04N 7/16* (2006.01)
  *H04N 5/445* (2006.01)
(52) U.S. Cl. .............................. 725/46; 725/9; 725/10; 725/14; 705/14
(58) Field of Classification Search .................. 725/46, 725/9–25; 705/14
  See application file for complete search history.

(56) References Cited

U.S. PATENT DOCUMENTS

| | | | |
|---|---|---|---|
| 5,594,740 A | | 1/1997 | LaDue |
| 5,758,257 A | | 5/1998 | Herz et al. |
| 5,798,785 A | | 8/1998 | Hendricks et al. |
| 5,801,747 A | | 9/1998 | Bedard |
| 5,831,664 A | * | 11/1998 | Wharton et al. ............... 725/81 |
| 5,845,257 A | | 12/1998 | Fu et al. |
| 5,848,396 A | * | 12/1998 | Gerace ......................... 705/10 |
| 5,854,793 A | | 12/1998 | Dinkins |
| 5,896,558 A | | 4/1999 | Wiedeman |
| 6,005,597 A | * | 12/1999 | Barrett et al. .................. 725/46 |
| 6,177,931 B1 | * | 1/2001 | Alexander et al. ............ 725/52 |
| 6,236,395 B1 | * | 5/2001 | Sezan et al. .................. 345/723 |
| 6,236,978 B1 | * | 5/2001 | Tuzhilin ....................... 705/26 |
| 6,286,140 B1 | * | 9/2001 | Ivanyi .......................... 725/14 |
| 6,314,571 B1 | * | 11/2001 | Ogawa et al. ................. 725/48 |
| 6,401,059 B1 | * | 6/2002 | Shen et al. .................... 703/27 |
| 6,486,892 B1 | * | 11/2002 | Stern ........................... 715/760 |

(Continued)

FOREIGN PATENT DOCUMENTS

WO    WO 9810589    3/1998

(Continued)

OTHER PUBLICATIONS

Wittig H., et al. "Intelligent Media Agents in Interactive Television Systems" Proceedings of The International Conference on Multimedia Computing and Systems, US, Los Alamitos, CA. May 15, 1995, pp. 182-189, XP 000603484.

(Continued)

*Primary Examiner*—Son P Huynh
(74) *Attorney, Agent, or Firm*—Rory D. Rankin; Meyertons, Hood, Kivlin, Kowert & Goetzel, P.C.

(57) ABSTRACT

A system and method for utilizing user profiles in an interactive television system. An interactive television system includes a broadcast station, a set-top box, and a remote mobile or fixed unit. The system is configured to create and/or update a user profile in response to an access made in a first access mode. In response to detecting a user access in a second access mode, the system accesses the user profile, selects data based at least in part on the user profile, and transmits the data to the user.

32 Claims, 6 Drawing Sheets

U.S. PATENT DOCUMENTS

| | | | |
|---|---|---|---|
| 6,571,279 B1 * | 5/2003 | Herz et al. | 709/217 |
| 6,611,654 B1 * | 8/2003 | Shteyn | 386/83 |
| 6,637,029 B1 * | 10/2003 | Eilat et al. | 725/46 |
| 6,647,370 B1 * | 11/2003 | Fu et al. | 705/8 |
| 6,727,914 B1 * | 4/2004 | Gutta | 345/719 |
| 6,754,907 B1 * | 6/2004 | Schumacher et al. | 725/87 |
| 6,871,186 B1 * | 3/2005 | Tuzhilin et al. | 705/26 |
| 6,898,762 B2 * | 5/2005 | Ellis et al. | 715/716 |
| 7,095,402 B2 * | 8/2006 | Kunii et al. | 345/169 |
| 7,117,518 B1 * | 10/2006 | Takahashi et al. | 725/86 |
| 2001/0032333 A1 * | 10/2001 | Flickinger | 725/39 |
| 2002/0059596 A1 * | 5/2002 | Sano et al. | 725/39 |
| 2002/0104087 A1 * | 8/2002 | Schaffer et al. | 725/46 |
| 2002/0122080 A1 | 9/2002 | Kunii et al. | |
| 2002/0129368 A1 * | 9/2002 | Schlack et al. | 725/46 |
| 2002/0143645 A1 * | 10/2002 | Odinak et al. | 705/26 |
| 2002/0151271 A1 * | 10/2002 | Tatsuji et al. | 455/3.05 |
| 2002/0183072 A1 * | 12/2002 | Steinbach et al. | 455/456 |
| 2003/0031465 A1 * | 2/2003 | Blake | 386/83 |
| 2003/0177504 A1 * | 9/2003 | Paulo et al. | 725/118 |
| 2004/0203630 A1 * | 10/2004 | Wang | 455/414.1 |
| 2005/0028208 A1 * | 2/2005 | Ellis et al. | 725/58 |
| 2005/0149964 A1 * | 7/2005 | Thomas et al. | 725/9 |
| 2005/0251827 A1 * | 11/2005 | Ellis et al. | 725/47 |
| 2005/0262542 A1 * | 11/2005 | DeWeese et al. | 725/106 |

FOREIGN PATENT DOCUMENTS

| | | | | |
|---|---|---|---|---|
| WO | WO 9901984 | 1/1999 | | |
| WO | WO 9926180 | 5/1999 | | |
| WO | WO 9945700 | 9/1999 | | |
| WO | WO 0004709 | 1/2000 | | |
| WO | WO 0011869 | 3/2000 | | |
| WO | WO 0013416 | 3/2000 | | |
| WO | WO 0060447 | 10/2000 | | |
| WO | WO 0060858 | 10/2000 | | |
| WO | WO 0070504 | 11/2000 | | |
| WO | WO 0115449 A1 * | 3/2001 | | 7/173 |
| WO | WO 0145408 | 6/2001 | | |
| WO | WO 0215447 | 2/2002 | | |

OTHER PUBLICATIONS

Supplementary European Search Report for Application No. PCT/US0332650 mailed Feb. 22, 2008.

* cited by examiner

CONVERGENCE OF INTERACTIVE TELEVISION AND WIRELESS TECHNOLOGIES

BACKGROUND OF THE INVENTION

1. Field of the Invention

This invention relates to interactive television, and more particularly, the convergence of interactive television and wireless technologies in networks based on interactive television.

2. Description of the Related Art

Television service providers, such as a satellite broadcaster or a cable multiple system operator (MSO), transmit audio-video streams to a viewer's television system. The viewer's television system frequently consists of a set-top box connected to a television set and a recording device, but may consist of any number of suitable devices. In addition to the audio and video that viewers typically think of as television programs, television service providers may transmit additional information as well. For example, the additional information may be instructions which are interpreted by an interpreter or virtual machine. Alternatively, a service provider may transmit HTML data for rendering by a presentation engine. If the broadcast is analog, this additional information may be encoded in the VBI (vertical blanking interval). If the broadcast is digital, additional information may be multiplexed with the audio and video according to a standard format, such as MPEG-2, or a proprietary format.

Interactive television systems provide a means to deliver interactive content as well as ordinary television audio and video to a large number of subscribers. Programs broadcast by these systems may incorporate television audio and video, still images, text, interactive graphics and applications, and many other components. The interactive content of the interactive television signal may therefore include application code, data associated with the audio and video, control signals, raw data and many other types of information. Both the interactive content and the audio and video data may be delivered to subscribers as "pushed" data. That is, the data is delivered to each of the subscribers, regardless of whether or not the subscribers requested the data.

As interactive television technology advances, it is possible to provide more personalized services to individual users. For example, it may be possible for a interactive television user to schedule the recording of various television programs well in advance of their broadcasting, as well as scheduling specific times for their playback. Furthermore, it may be possible for a user to receive notifications for upcoming programs that are of similar content to those that have been recorded in the past.

Although interactive television may provide a number of services, such as those noted above, additional capabilities may be possible using existing interactive television technologies, or by combining other technologies with interactive television.

SUMMARY OF THE INVENTION

A system and method combining wireless and interactive television technologies is disclosed. In one embodiment, an interactive television system includes a broadcast station, a set-top box, and a remote unit. Generally speaking, a user may access the system through various means. For example, the user may communicate within the system via a set-top box, cell phone, PDA, or other device. The system is configured to creating and maintain a user profile which reflects activity of the user within the system. Activity performed in a first mode, such as television viewing, may cause the creation and/or updating of a user profile which reflects the user's viewing activities. Similarly, cell phone or other mobile unit activities and communications may cause the creation and/or updating of an already existing user profile. Information which is conveyed to a user is based at least in part on the data in the user profile. Accordingly, in one embodiment, a user's cell phone activity may affect the information the user receives at home on their television, and vice versa.

The mobile unit may be one of several different types of devices. In one embodiment, the mobile unit may be a cellular telephone. In other embodiments, the mobile unit may be a personal digital assistant (PDA), a smart remote control or a portable computer system. The mobile unit may be configured for wireless communications with both the set-top box, broadcast station, other mobile devices, or any other device configured to communicate within or through the television system. The mobile unit may send data to either the broadcast station or the set-top box. Similarly, the mobile unit may receive data from the broadcast station or the set-top box. Intermediate communications may be possible as well. For example, data may be transmitted from the broadcast station to the set-top box via the internet before being transmitted to the mobile unit. Similarly, it may be possible for data to be transmitted from the mobile unit, to the set-top box, and then to the broadcast station.

In some embodiments, a fixed unit may also be present. For example, in one embodiment, a fixed unit such as a personal computer may be incorporated and utilized in the system. The system user may also be able to connect to and utilize other functions of the system (provided by the mobile unit, broadcast station, and set-top box) through an internet connection or a combination of internet and wireless communications.

The presentation of data at the mobile unit may vary depending upon the particular embodiment. In some embodiments, the mobile unit may include technology to indicate its physical location, and thus the location of the user. In one embodiment, global positioning system (GPS) technology may be present in the mobile unit. In another embodiment, the physical location of the mobile unit may be determined by triangulation, such as triangulating from multiple cell phone antenna towers.

The broadcast station may be a station where programming and content are broadcast to a number of users. The broadcast station may include a database in which user profiles are stored for each individual user. Data may be received by the broadcast station from either the set-top box (e.g. in a "store and forward" mode) or directly from the mobile unit itself. Similarly, the broadcast station may send data to the set-top box or to the mobile unit directly. The broadcast station may transmit both normal television (i.e. non-interactive) programming, as well as interactive television programming and other content. Content may be "pushed" to the mobile unit (i.e. sent without a user request) or "pulled" (sent to the mobile unit based on a user request or other action). It should be further noted that the set-top box may be configured to store a user profile for its associated user.

The user profile may include basic user information, various user preferences, and other information. The information in the user profile may be compiled from various user actions, such as programs watched, channels watched, or other content accessed. The user may also input information into the user profile. Such information may include credit card numbers, frequent flier memberships, preferences, and virtually any other information that may define the user. This information may be combined with other user information in the user profile in order to determine content that is to be sent to the set-top box and/or the mobile unit.

BRIEF DESCRIPTION OF THE DRAWINGS

Other aspects of the invention will become apparent upon reading the following detailed description and upon reference to the accompanying drawings in which.

Figure 1:
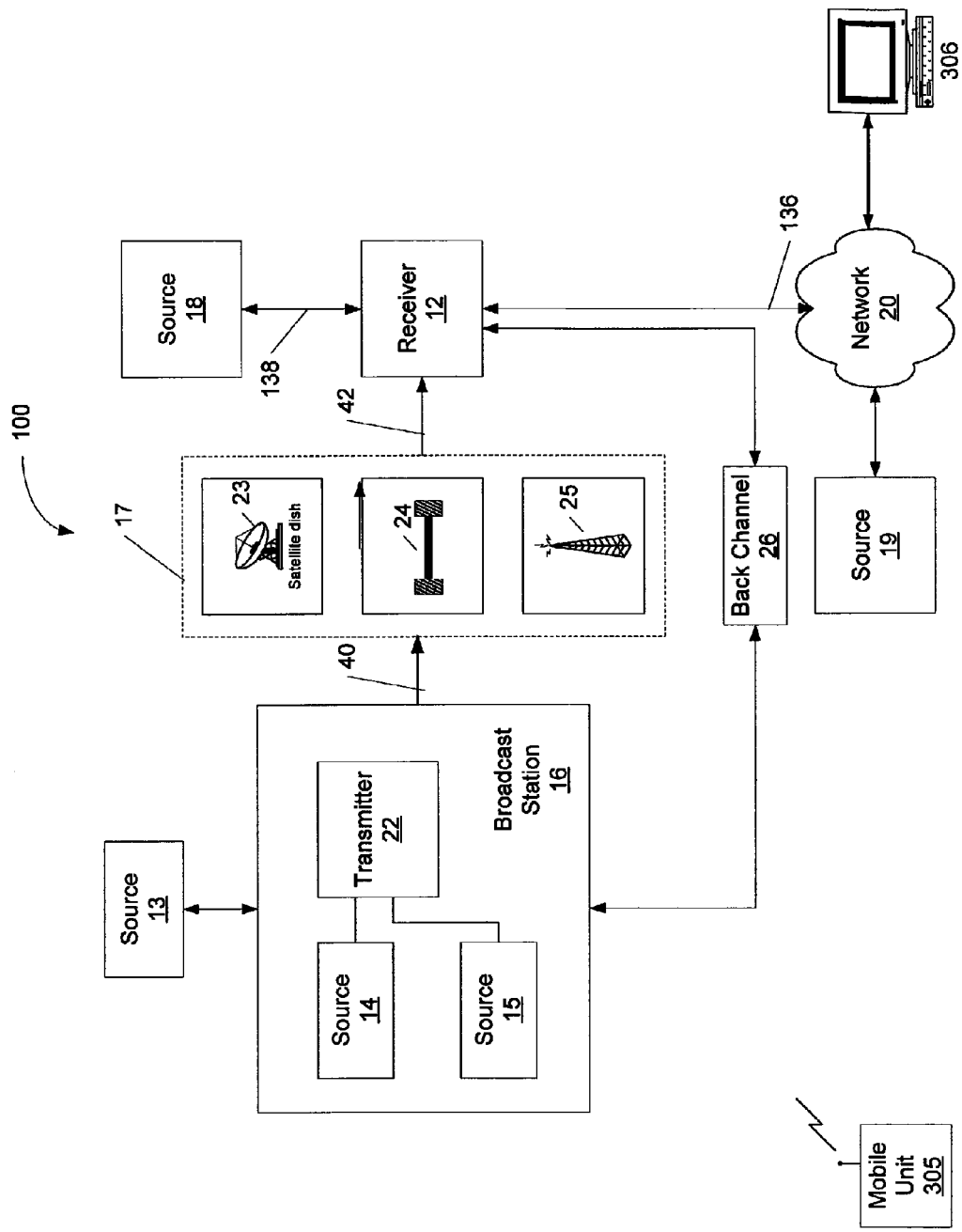
FIG. 1 is a block diagram of one embodiment of a television system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION OF THE INVENTION

Referring to FIG. 1, one embodiment of a television system 100 is shown. In the embodiment shown, a receiving device 12 is coupled to several sources of programming and/or interactive content. Receiving device 12 may include any number of suitable devices, examples of such devices include a set-top box (STB), a television (TV), a video cassette recorder (VCR), a personal video recorder (PVR), a personal digital assistant (PDA), a personal computer (PC), a video game console, or a mobile/cell phone.

Included in the embodiment of FIG. 1, a broadcast station 16 is coupled to a receiving device 12 via a transmission medium 17 and back channel 26. In addition, receiving device 12 is coupled to a source 18 and source 19 via network 20. In one embodiment, receiving device 12 may include a database configured to store user profiles. User profiles may also be located at a headend or other location within the system. In some embodiments, user profile data may be stored in more than one location Further, broadcast station 16 is coupled to a remote source 13. In the embodiment shown, broadcast station 16 includes sources 14 and 15 and transmitter 22. Transmission medium 17 may comprise a satellite based system 23, a cable based system 24, a terrestrial or multiple multi-point distribution service (MMDS) based system 25, a combination of these systems, or some other appropriate system of transmission. A personal computer 306 may also be configured to communicate within the system 100. In one embodiment, network 20 may comprise the Internet and the personal computer 306 may be configured to access Internet sites as well as communicate with the broadcast station 16, receiver 12, and other devices in the system. Also illustrated is a mobile unit 305 which may be configured for wireless communications with television system 100 in a number of different ways. For example, mobile unit 305 may be configured to communicate with broadcast station 16 through transmission medium 17, through a wireless phone network, through a wireless internet network, or otherwise.

In the embodiment of FIG. 1, broadcast station 16 may include a variety of sources 14 and 15 of content to be utilized and conveyed by transmitter 22. Content sources 14 and 15 may include databases, application servers, other audio/video sources, or other data sources. In one embodiment, content may be created at a source 14 which may include an authoring station configured to create such content. An authoring station may include a computer workstation configured with software which aids in the development of interactive content. An authoring station may be part of broadcast station 16 in which case the conveyance of the created content may be through a local computing network, or similar configuration. Alternatively, an authoring station may be remotely located 13 from broadcast station 16. In an embodiment where authoring station is not directly coupled to broadcast station 16, the content created by a source 13 may be conveyed to broadcast station 16 via Internet, broadcast, cable, etc. In some cases, content created at a remote location 13 may first be transferred to a storage medium, such as a CD-ROM or DVD-ROM, and transported to broadcast station 16 via more conventional means where it may be stored in a database or other storage device.

Subsequent to its creation, content from sources 13, 14 and 15 may be delivered to client 12 through a broadcast transmission network. This network consists essentially of a broadcast station 16 which assembles the content from sources 13, 14 and 15 and processes (e.g., digitizes, compresses and packetizes) the content, and a transmission network 17 which receives the content 40 from broadcast station 16 and conveys it 42 to client 12. (It should be noted that client 12 may be only one of many devices to which this content is distributed.) In one embodiment, broadcast station 16 includes software and/or hardware which is configured to process the content conveyed by sources 13, 14 and 15 as described above. A second delivery mechanism may include a direct point-to-point connection 138 between client 12 and source 18 which may be some type of server. This connection 138 may be made via an ordinary telephone line, cable, wireless, or otherwise. A third delivery mechanism may also be a point-to-point connection 136, but transmission of the content from a source 19 to client 12 is made via one or more shared networks (e.g., over the Internet). Also illustrated in FIG. 1 is a back channel (or return path) 26 by which client 12 may convey to and/or receive data from broadcast station 16. Back channel 26 may comprise a telephone line, cable, wireless, or other connection.

One delivery mechanism, the direct point-to-point connection to a source of content, may comprise communication via an ordinary telephone line. This type of connection is typically initiated by the client to convey information to, or retrieve information from, a data server. Another delivery mechanism, the point-to-point connection through one or more networks, may comprise a typical connection between nodes on the Internet. Because data may be routed through many different shared networks in this case, it may be read, stored and written many times as it is transmitted from source 19 to client 12. The third delivery mechanism may include a satellite, cable or terrestrial broadcast network.

Figure 2:
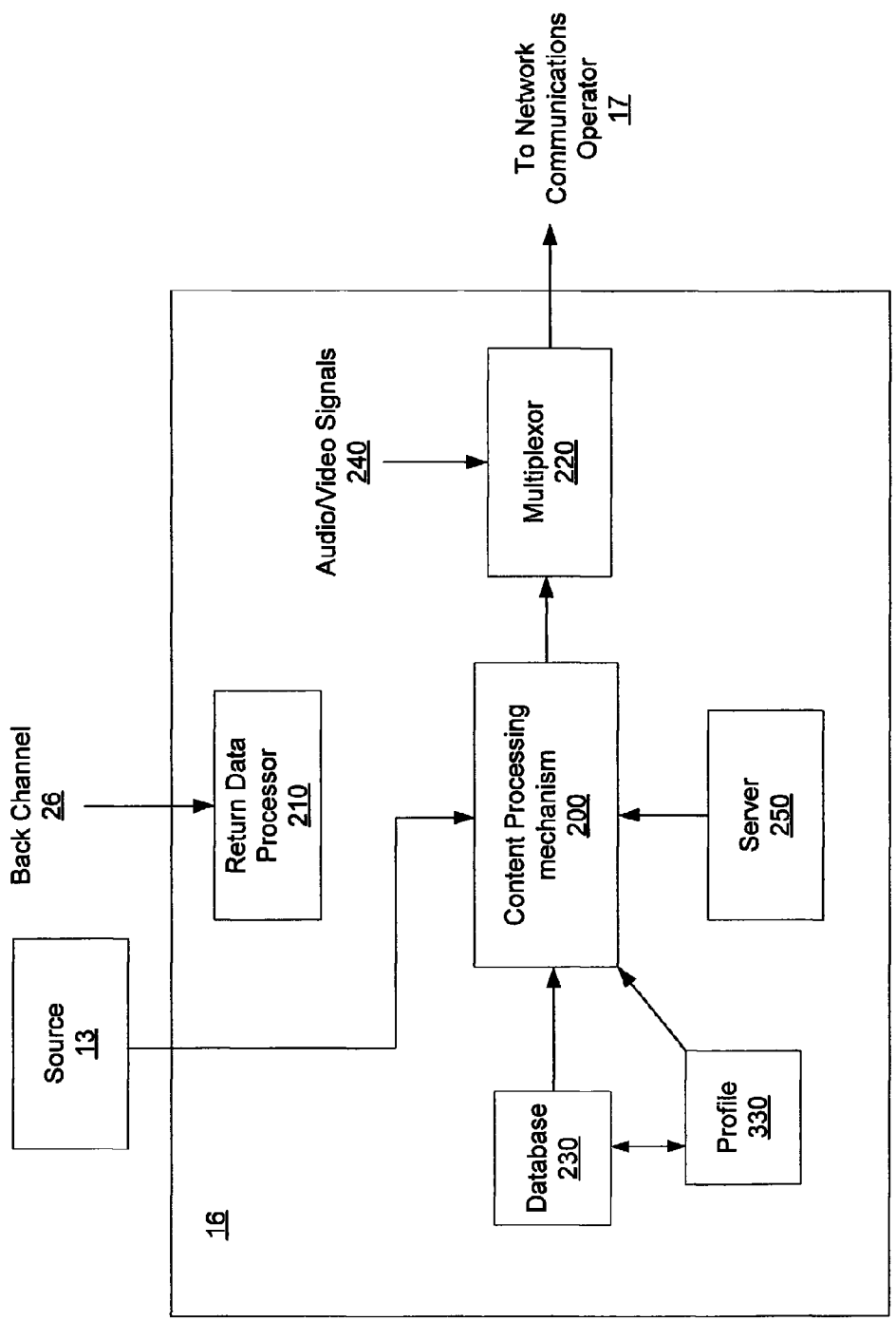
FIG. 2 is a block diagram of one embodiment of a broadcast station.

Turning now to FIG. 2, an overview of one embodiment of a broadcast station (head-end) 16 is shown. The broadcast station 16 of FIG. 2 includes an application server 250 and a database 230 which contains previously created interactive content. Also shown in FIG. 2 is a source 13 of content which is external to broadcast station 16 and coupled to broadcast station 16. Database 230, server 250, and source 13 are coupled to a content processing mechanism 200 which is configured to process the content received and convey the processed content to a multiplexer 220. Also coupled to multiplexer 220 is a source 240 of audio/video signals. One or more user profiles 330 may also be stored for use by content processing mechanism 200 and/or database 230. In some embodiments, database 230 may actually store user profiles 330, although they may also be stored separately as shown in this embodiment. User profiles 330 may include information for a particular user of the network, including personal and/or viewing preferences, credit card numbers, and other information. User profiles 330 will be discussed in greater detail below.

In one embodiment, content processing mechanism 200 may comprise a computer and may also be coupled to receive and convey content from the Internet or World Wide Web. Processing mechanism 200 is configured to convey the processed content to multiplexer 220. Multiplexer 220 is also coupled to receive audio/video signals 240. Multiplexer 220 multiplexes the received signals and conveys the multiplexed signal to network communications operator 17 where it is subsequently conveyed to a receiving device. Finally, broadcast station 16 includes a return data processor 210 coupled to back channel 26. In one embodiment, return data processor 210 may comprise a modem which receives data for further processing within broadcast station 16. While the above description describes a source of interactive content as being at a broadcast station 16, this need not be the case. In an alternative embodiment, database 230, and content processing mechanism 200 may reside elsewhere, such as at the location of a network communications operator 17, or otherwise. An example of such an alternative embodiment may be a cable station which inserts interactive content into a broadcast signal prior to transmission.

Figure 3:
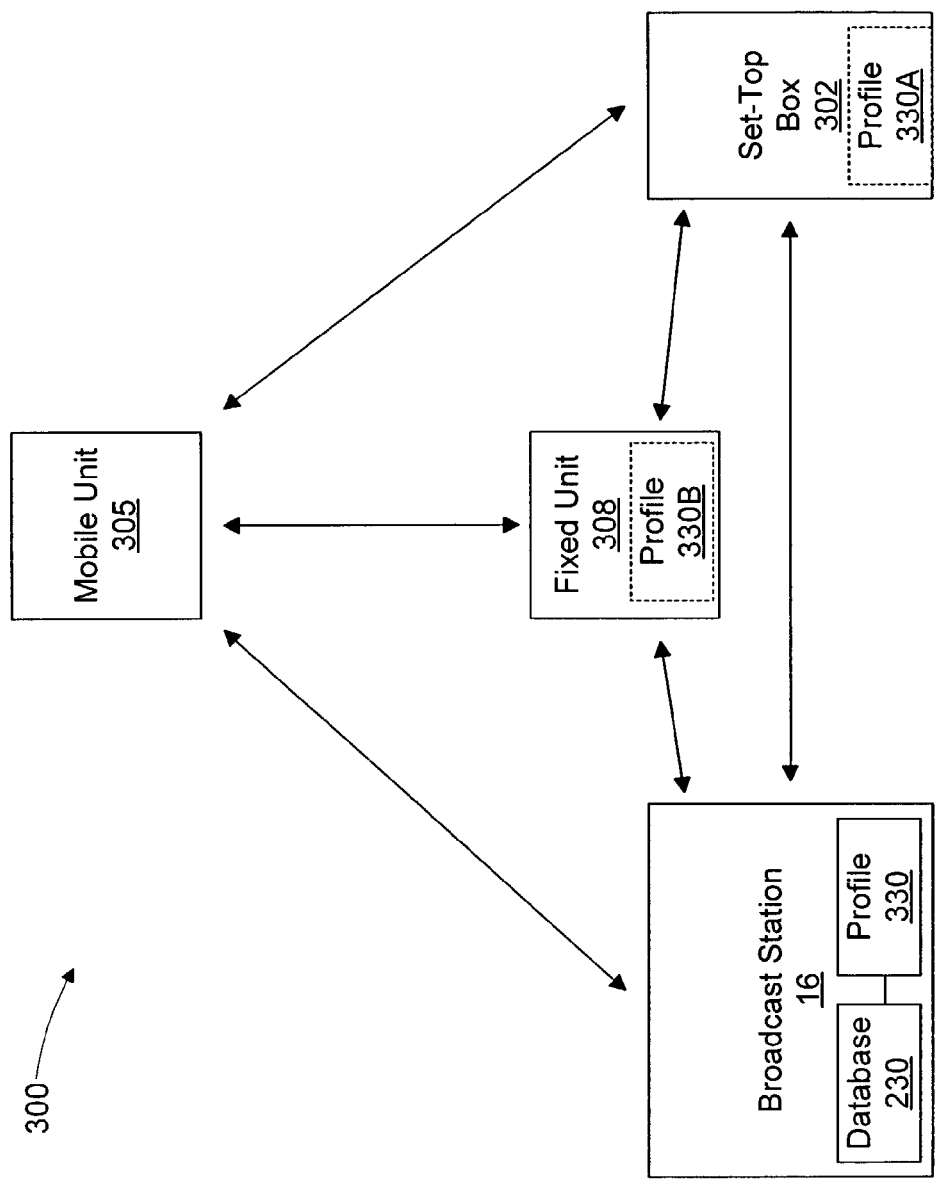
FIG. 3 is a block diagram of one embodiment of a communications network comprising a broadcast station, a set-top box, and a mobile unit.

Turning now to FIG. 3, a block diagram of one embodiment of a communications network comprising a broadcast station, a set-top box, and a mobile unit is shown. Communications network 300 includes broadcast station 16, set-top box 302, and mobile unit 305. Mobile unit 305 may be configured for wireless communications with both broadcast station 16 and set-top box 302. Broadcast station 16 may be configured for communications with set-top box 302 through either wireless means or through hardwired means (e.g. cable).

Some embodiments may include fixed unit 308. Fixed unit 308 may be a device such as a personal computer user's office or place of business. The fixed unit 308 may be configured to communicate with any of the other units in the system, either directly or indirectly. For example, fixed unit 308 may be configured to directly communicate with broadcast station 16 or set-top box 302 via an internet connection. Similarly, fixed unit 308 may be configured to communicate with mobile unit 305 indirectly, by first transmitting data to broadcast station 16 via an internet connection, wherein broadcast station 16 then relays the data to mobile unit 305 through a wireless link. In general, fixed unit 308 may communicate with other units of the communications network 300 depending on whether it is equipped for wireless communications, hard-wired communications, or both.

Mobile unit 305 may be one of several different devices configured for wireless communications. In one embodiment, mobile unit 305 may be a cellular telephone that is data enabled. A data enabled cellular telephone may be able to utilize services beyond that of normal phone services. In another embodiment, mobile unit 305 may be a personal digital assistant (PDA) or similar device. In still another embodiment, mobile unit 305 may be a mobile computer system that is configured for wireless communications. Other embodiments of mobile unit 305 are possible and contemplated, including embodiment designed specifically for use with the communications network described herein.

Mobile unit 305 may be used to enter and transmit information which may be used to create or update a user profile. Information entered through mobile unit 305 may be directly transmitted to broadcast station 16, or may be transmitted to set-top box 302. If the information is transmitted to set-top box 302, the information may be stored and then forwarded to broadcast station 15. In addition, mobile unit 305 may be configured to communicate directly with set-top box 302 via a wireless protocol.

In addition to other features, mobile unit 305 may include location detection technology, which may be used to pinpoint the precise location of the mobile unit, and hence its user. The location information may be combined with other information stored in the user profile in determining the timing and content of data transmissions to mobile unit 305. In one embodiment, the location detection technology may comprise a global positioning system (GPS). In another embodiment, location detection technology may utilize techniques such as triangulation from multiple data transmitters.

Devices that may comprise mobile unit 305 may differ in their ability to present information. As such, user profiles may be used to ensure that only relevant information is present to the user of a particular mobile unit 305. The information presented may be based both on user information and the type of device that comprises the user's embodiment of mobile unit 305. For example, if mobile unit 305 is a portable computer system, data may be presented or formatted differently than it would if mobile unit 305 is a cellular telephone.

Broadcast station 16 may be similar to that illustrated in, FIG. 2, or may be another embodiment. Broadcast station 16 is configured to communicate with both set-top box 302 and mobile unit 305. In one embodiment, broadcast station 16 may communicate with set-top box through wireless means, such as a satellite link or other type of broadcast television link. In another embodiment, broadcast station 16 may communicate with set-top box 302 by hard-wired means, such as a cable television link.

Communications between broadcast station 16 and set-top box may encompass a wide variety of data exchanges. Broadcast station 16 may be configured to send television programming to set-top box 302. Television programming may be broadcast by either analog or digital signals, and may include signals for high-definition television (HDTV). Communications between broadcast station 16 and set-top box 302 may also include internet communications. Broadcast station 16 may include connections to the internet, thereby allowing a user of set-top box 302 to send and receive e-mail, browse the world wide web, and perform other internet related activities. Broadcast station 16 may include database 230. Database 230 may be used to store user profiles. Broadcast station 16 may receive data for use in generating the user profile from set-top box 302, fixed unit 308, or directly from mobile unit 305. Broadcast station 16 may further be configured to access data from user profiles stored in database 230. The data accessed from the user profile may be used to determine information that is to be sent to set-top box 302, fixed unit 308, and/or mobile unit 305. Information transmitted by broadcast station 16 may be either "pushed" (information is sent without a user request) or "pulled" (information is sent based on a request by the user). Optionally, a profile 330A may be stored in set-top box 302, or in fixed unit 330B. In general, user profile data may be stored anywhere within system 300. Multiple, cached copies of user profile data may also be maintained within system 300. Further, user profiles 330 or database 230 may also include device profiles for devices which may access the system in different modes. Such device profiles may include information describing particular details about devices which may be used to access the system 300. One example of device profiling is the Wireless Application Protocol User Agent Profile Specification (WAP-248-UAPROF-20011020-a) which is concerned with capturing classes of device capabilities and preference information. These classes include the hardware and software characteristics of the device as well as information about the network to which the device is connected. The device profile contains information used for content formatting purposes. A device profile is distinct from a user profile that would contain application-specific information about the user for content selection purposes. These device profiles may then be used to select and format data which is suitable for presentation on the accessing device.

User profiles may include a wide variety of user information, and may include both user-entered information as well as usage history. User-entered information may include basic personal information (e.g. date of birth, etc.), credit card account information, memberships such as frequent flyer memberships, and various user preferences. Usage history information may be generated based on a user's activity on the network, including television viewing habits and preferences, locations browsed on the World Wide Web, and any other type of network access. User profiles may also be affected by the physical location and movements of a user who utilizes a device which can be tracked (i.e., a location trackable device). For example, if a user makes a phone call or other access from a location identified as a Mexican food restaurant, this fact may be noted in the user profile and used to indicate the user may like Mexican food. Alternatively, if a user frequently performs accesses from particular coffee/internet cafes, this fact may be noted in the user profile. Thus, user profiles may be created and updated based on user inputs and subsequent usage history on multiple devices and then shared by multiple devices. In some embodiments, user profiles may be automatically generated by a network operator. In other embodiments, the user profile may be created manually by the user. User profiles may also be created by a set-top box or other computing device.

In one embodiment, the user profiles are built by the broadcast service provider based upon the viewing data accumulated within the broadcast network. Such data may come, for example, from previous transactions. This data includes information on the various transactions which take place in the network, and may include transactions ranging from requests for pay-per-view events or subscription to broadcast provider or other third party provider services to interactive transactions to simple selections of programs. The specific data recorded in regard to the network transactions may vary from system to system. Transaction data may be recorded at the broadcast station. Data which is available to the broadcast station at the time of the transaction ("on-line" data) is collected at the broadcast station. Data which is not available to the broadcast station at the time of the transaction ("local" data) may be collected elsewhere, such as at the set-top box or the mobile unit. Local data is preferably stored in a non-volatile RAM of the set-top box so that it is not lost if the set-top box is powered down. The local data is accumulated in the set-top box until a predetermined amount of data has been collected or a predetermined time period (e.g., one month) has expired. The local data may then transmitted to the broadcast station. In some embodiments, the transmission of the local data to the broadcast station can be externally triggered by signals which are broadcast or individually transmitted to the set-top boxes. In other embodiments, the transmission of the local data to the broadcast station takes place when other real-time data, such as a purchase, needs to be transmitted to from the set-top box to the broadcast station.

The broadcast station may accumulate data on an entire population of subscribers to the broadcast network. This data forms the broadcast station's cumulative database. Based upon the information in the cumulative database, the broadcast service provider can determine viewing patterns, preferences and other information which form profiles corresponding to different types of viewers. These viewer population profiles may indicate that viewers of a particular program also tend to view a second program. Similarly, the profiles may indicate that viewers of a particular program may be interested in particular products and disinterested in others. For example, a viewer who watches an animated movie on a pay-per-view basis may be more interested in buying a videotape of cartoons than a videotape of an athletic event. Based upon the indications of the profiles, the broadcast service provider can make available to particular viewers the programs which they are most likely to watch or products and services which they are most likely to purchase. In this manner, the broadcast service provider can increase the effectiveness of marketing over the network by filtering or directing advertisements and programs to the viewers who are most likely to be impacted by them. The filtering of the program content of the broadcast program signal may be accomplished by generating a viewer preference filter. A viewer preference filter may be created according to a particular viewer's viewing habits, or personal preferences. Viewer preference filters may also be configured to take into account viewer population profiles and the relation of the viewer data to the profiles. Additionally, the viewer preference filter can be altered by the broadcast provider to promote particular services.

It should be noted that the "viewer preference filter" is used herein to describe data which is used, not simply to block certain content of a broadcast signal, but to provide a basis for customizing the content of the broadcast signal. The viewer preference filters can thus be considered individualized viewer preference profiles. The viewer preference filters can be used by applications which may block portions of the broadcast signal or portions of individual programs. For example, an application may block a commercial or a component of the commercial, such as a jingle. The viewer preference filters can also be used by applications which rearrange or add to the content of a broadcast signal. An example of such an application is one which changes the order in which channels are presented in an electronic programming guide. If the viewer is a sports fan, this application might present channels with basketball games before those having game shows. An application might also take some action apart from changing the content of the displayed programs. For instance, the application might selectively reject e-mail sent to the set-top box based on the viewer's profile (as contained in the viewer preference filter) and the likelihood that the viewer would not be interested in the e-mail. With the advent of local storage in the receiver, the filter can also be used to select the content that should be stored in the receiver for later use. Further, the filter may be used to select and present data which has previously been stored in the receiver.

The viewer preference filter may be implemented as a component of set-top box 302, the filter may be implemented in a number of other ways, such as in a software application, and need not be a separate component of set-top box 302. (It should also be noted that "transmitting filters" to the set-top box as used herein can mean both transmitting actual software filters and transmitting data which is used by hardware or software at the set-top box to implement filtering functions in a particular implementation.) The set-top box filters the remaining program content according using the viewer preference filter and displays or executes the filtered program signal components. The filtered broadcast program signal may then be passed on to a television. The television may be a standard television unit or a video monitor employing any suitable television format (e.g., NTSC or HDTV), or it may be replaced by other devices, such as a video recorder or another form of mass storage such as a magnetic hard disc or a writeable optical disc.

Information stored in the user profile may be combined with other information in order to determine data that is to be transmitted to mobile unit 305. In one embodiment, information in the user profile may be combined with location information provided by location detection technology. For example, a GPS system in one embodiment of mobile unit 305 may detect that the mobile unit (and thus its user) are located near a Mexican restaurant. The user profile of the user of mobile unit 305 may include information indicating that the user has a preference for Mexican food. Responsive to receiving these two pieces of information, broadcast station 16 may transmit information to mobile unit 305 that may indicate to its user that he is near a Mexican restaurant.

In another example, a user of network 300 may be watching interactive television and may see an advertisement for a product he finds interesting. The user of network 300 may "tag" this advertisement using mobile unit 305, thereby indicating interest in the product. This information may initially be sent from mobile unit 305 to set-top box 302, and may then be forwarded to broadcast station 16, where the information may be stored in the associated user profile. Broadcast station 16 may further respond by sending to mobile unit 305 information on where to purchase the advertised product. In addition, if mobile unit 305 includes location detection technology, it may be possible for broadcast station to transmit information on how to get to the location where the product is sold once the location of mobile unit 305 has been detected. If the user purchases the advertised product responsive to receiving information on where to purchase the product, the associated user profile 330 may be updated with usage history information.

In still another example, a user of network 300 may watch a cooking show on interactive television. The user may decide that they are interested in a recipe that is presented on the cooking show. The selection of the recipe, along with its ingredients and cooking instructions may then be stored in the associated user profile. Recipe information may be recalled on demand by the user of mobile unit 305, thereby assisting the user in obtaining ingredients for the recipe, or in cooking the dish defined by the recipe.

Mobile unit 305 may also be used to program set-top box 302 to record programming (or a device coupled to set-top box 302). Mobile unit 305 need not be in the proximity of set-top box 302 in order to perform the programming functions. A user of mobile unit 305 may enter data concerning the program to be recorded (i.e. program start time, channel, etc.). This data may be transmitted to broadcast station 16, where it is then forwarded to set-top box 302. Alternatively, data may be transmitted from mobile unit 305 directly to set-top box 302 in some embodiments.

Another possible use for network 300 is as a mechanism for electronic coupons. In one embodiment, broadcast station 16 may transmit an electronic coupon to mobile unit 305 based on information in the associated user profile. Subsequent to receiving the coupon via mobile unit 305, the coupon may be redeemed at a store that honors such coupons. In one embodiment, mobile unit 305 may transmit the coupon to the cashier using a wireless technology (e.g. IR). Once transmitted, the coupon may be removed from mobile unit 305. In one embodiment, a mobile unit may include technology to identify the location of the mobile unit (GPS, or other technology). When the mobile unit is detected by the system to be in the vicinity of a retailer which carries the product corresponding to the previously stored coupon, the system may automatically alert the user via the mobile unit. The user may then respond to the notification as desired.

The various selections made in the above examples may also result in the setting of bookmarks in set-top box 302. In various embodiments, bookmarks may also be stored by broadcast station 16 or set-top box 302. Furthermore, bookmarks may also be stored in fixed unit 308 for those embodiments having a fixed unit. Once the bookmarks are set, they may be removed from mobile unit 305, which may have limited storage space. However, mobile unit 305 may still access these bookmarks at any time. The bookmarks may be accessed by interactions between mobile unit 305 and one of the other units (set-top box 302, broadcast station 16, or fixed unit 308).

Figure 4:
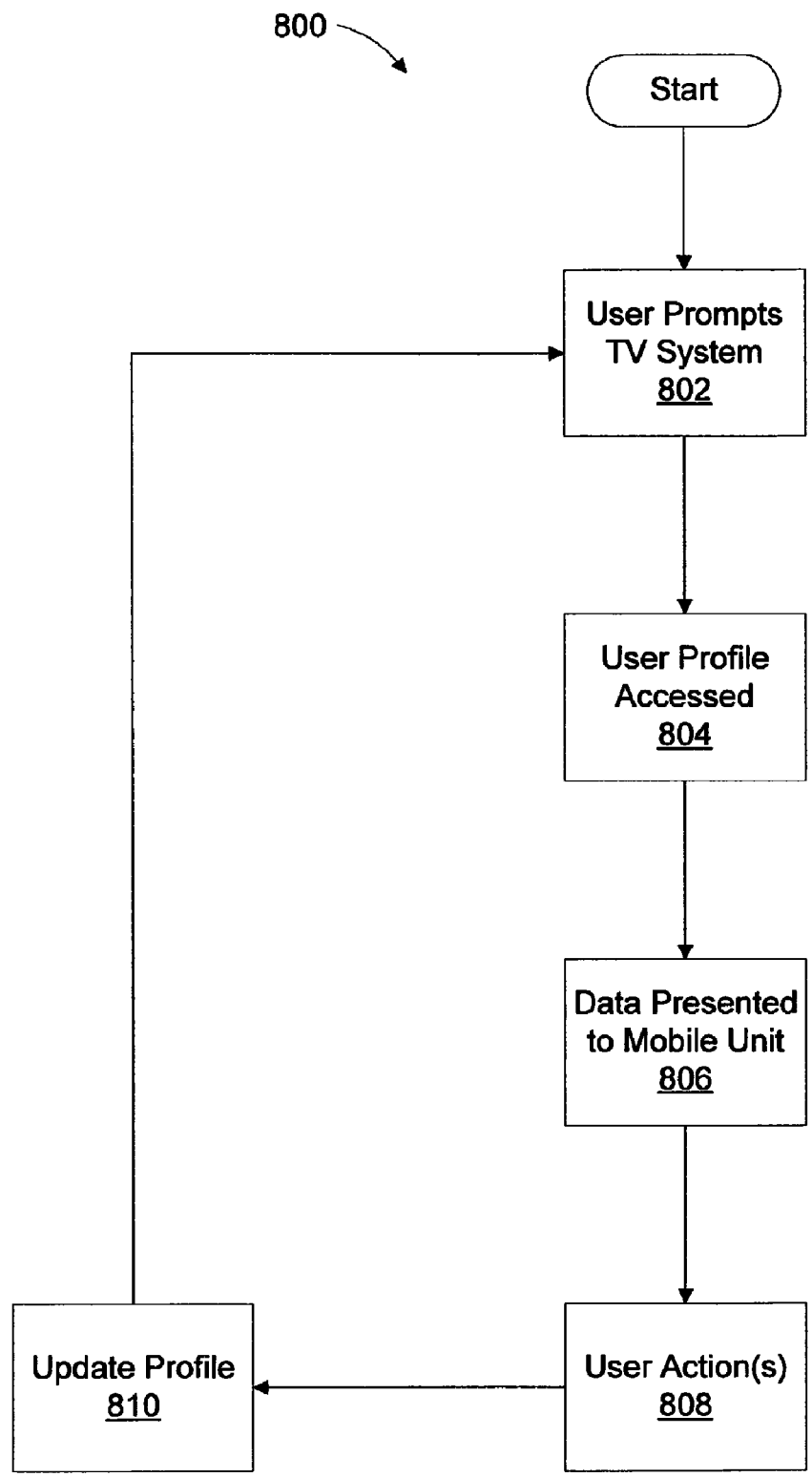
FIG. 4 is a flow diagram illustrating one embodiment of the updating of a user profile based on actions taken with a mobile unit.

Turning now to FIG. 4, one embodiment of a flow diagram illustrating the updating of a user profile based on actions taken with a mobile unit is shown. The embodiment shown illustrates one of many possible sequences that may involve user interaction with the TV system, as well as accessing and/or updating a user profile.

Method 800 begins with a user prompting the TV system in item 802. The user may use the mobile unit 305 described above to access the TV system. In some cases accessing the TV system may involve the user having a mobile unit being in the general vicinity of a television set having a set-top box (e.g. the user is watching a television program on interactive TV). In another example, a user at a location remote to both the broadcast station and set-top box may prompt the TV system for information by manually inputting data into the mobile unit, which may then be transmitted to various places, such as the broadcast station or the set-top box via a wireless link. In yet another example, the mobile unit may automatically prompt the TV system without any manual input from the user based on detecting the location of the user, and hence the location of the mobile unit. Various means may be used for location detection, such as the use of a global positioning system or a triangulation system.

Following a prompt of the TV system, a user profile associated with a user of the mobile unit may be accessed (item 804). As discussed above, the user profile may include information for a specific user of the TV system. The specific information may include basic personal information, credit card information, usage history, and viewer preference filters. This information may be combined with location information and other information (e.g. date/time of day) in order to select data which may be presented to the mobile unit (item 806). In addition to the user profile and other information, the presentation of data may be dependent upon the type of unit making the access. The exact format of the data may be different for various types of mobile units, including cellular phones, PDA's, portable computers, and other types.

Based on the data presented to the mobile unit, the user may take certain actions (item 808). The user's actions may be recorded by the mobile unit, and the mobile unit may also transmit information corresponding to these actions back to the TV system. This information may be recorded as usage history, and may also be used to update the user profile item 810.

Countless examples may be presented of practical uses for this method. In one example, a user of the interactive TV system may be watching a commercial for a new product offering. The interactive television may prompt the user as to whether they are interested in the product. If the user indicates an interest, this information may be recorded and used to update the user profile. Alternatively, if the user indicates a negative interest, the user profile may be updated to prevent the interactive TV system from prompting the user again concerning this product. If the user expresses interest in the product, the user may at a later time request information on the location(s) of the restaurant(s) that offer this product. Furthermore, if it is detected that the user is operating the mobile unit in the vicinity of a retailer that offers the product, the TV system may then alert the user to this fact. The user may also record a purchase of the product, which may then be recorded as usage history in order to update the user profile.

Another example may relate to the use of the preference filters. In this example, a user watching interactive television may be presented with options to watch sports programming. Supposing the user has a preference for watching football games and other related programming over other types of sports, the user may typically choose to ignore other programming. Usage history incorporated into the user profile may then cause a preference filters to be updated such that the other (non-football) sports-related programs are not presented to the user. Subsequently, when accessing the system for sports scores via a mobile unit, the user is presented with football scores by default. In this manner, the user need not receive and traverse scores and information on items of no interest to the user. Furthermore, the user may manually set user preferences such that reminders of upcoming football related programming are sent to the mobile unit. Thus, a user who is in a remote location may receive a reminder of a football game or football related program that may be telecast at some point later in the day.

Figure 5:
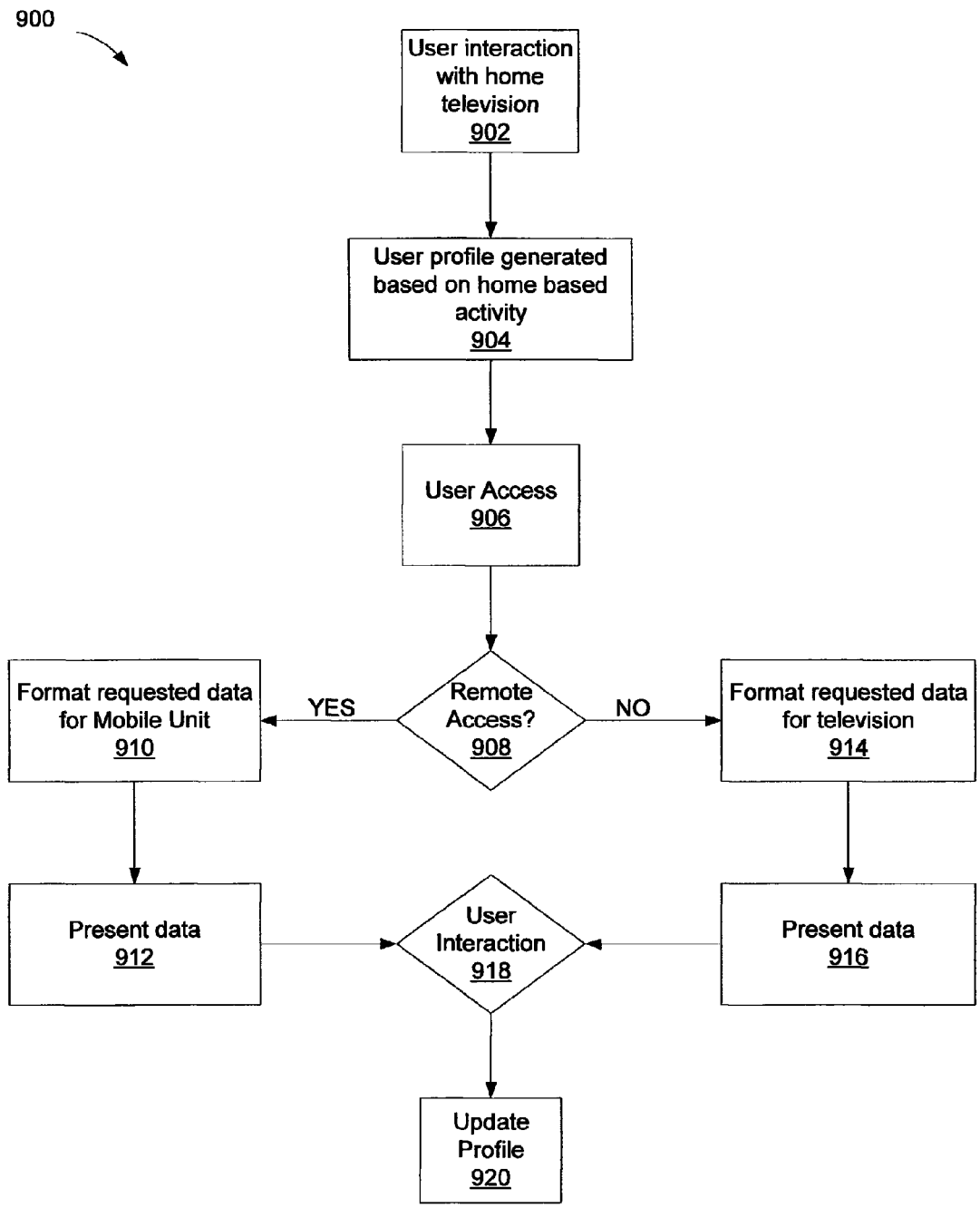
FIG. 5 is a flow diagram illustrating one embodiment of a method for interacting with the system of FIG. 1.

Turning now to FIG. 5, one embodiment of a method 900 for interacting with a system as described above is illustrated. In the embodiment shown, a television viewer at home watches particular programs and may interact with applications. Based on the viewer's activity, a profile reflecting this activity is generated 904. Alternatively, an existing user profile may be updated. The profile may include information gathered in either an "active" and/or "passive" manner. For example an "active" manner may include providing specific information in response to a request, such as a survey. Passively gathered information may include information based on a viewer's viewing habits. Many such techniques are possible and are contemplated.

Subsequent to the creation of the profile, the system detects a viewer/user access 906. The nature of the access is then determined 908. Upon determining the type of access, data is formatted to correspond to the type of access. For example, if the access is detected to be a remote access by a mobile unit, the data format is selected to correspond to the mobile unit 910. The user profile corresponding to the accessing user is then accessed 912. Based on the user profile, specific information may be selected for presentation to the user. The selected data is then formatted and conveyed to the mobile unit. Alternatively, if the user access is detected to be a non-remote access 908, the selected format is chosen 914 to correspond to a television or other predetermined device. Utilizing the user profile, data is selected and conveyed to the user/viewer 916. If the user/viewer interacts 918 with the presentation to the remote or non-remote device, the user profile may then be updated 920 in accordance with that interaction.

It is noted that the user profile may be created and/or updated based on accesses from any device within the system. Further, the user profile may be used to select information to presentation to any device within the system. In some cases, accessing the user profile of a user performing an access may require accessing the user profile at a remote location. For example, if a user profile is stored in a user's set-top box and the user performs an access using a wireless phone through a wireless phone network, communication through the phone network, television broadcast network, and/or the Internet may be required in order to access the user profile.

Figure 6:
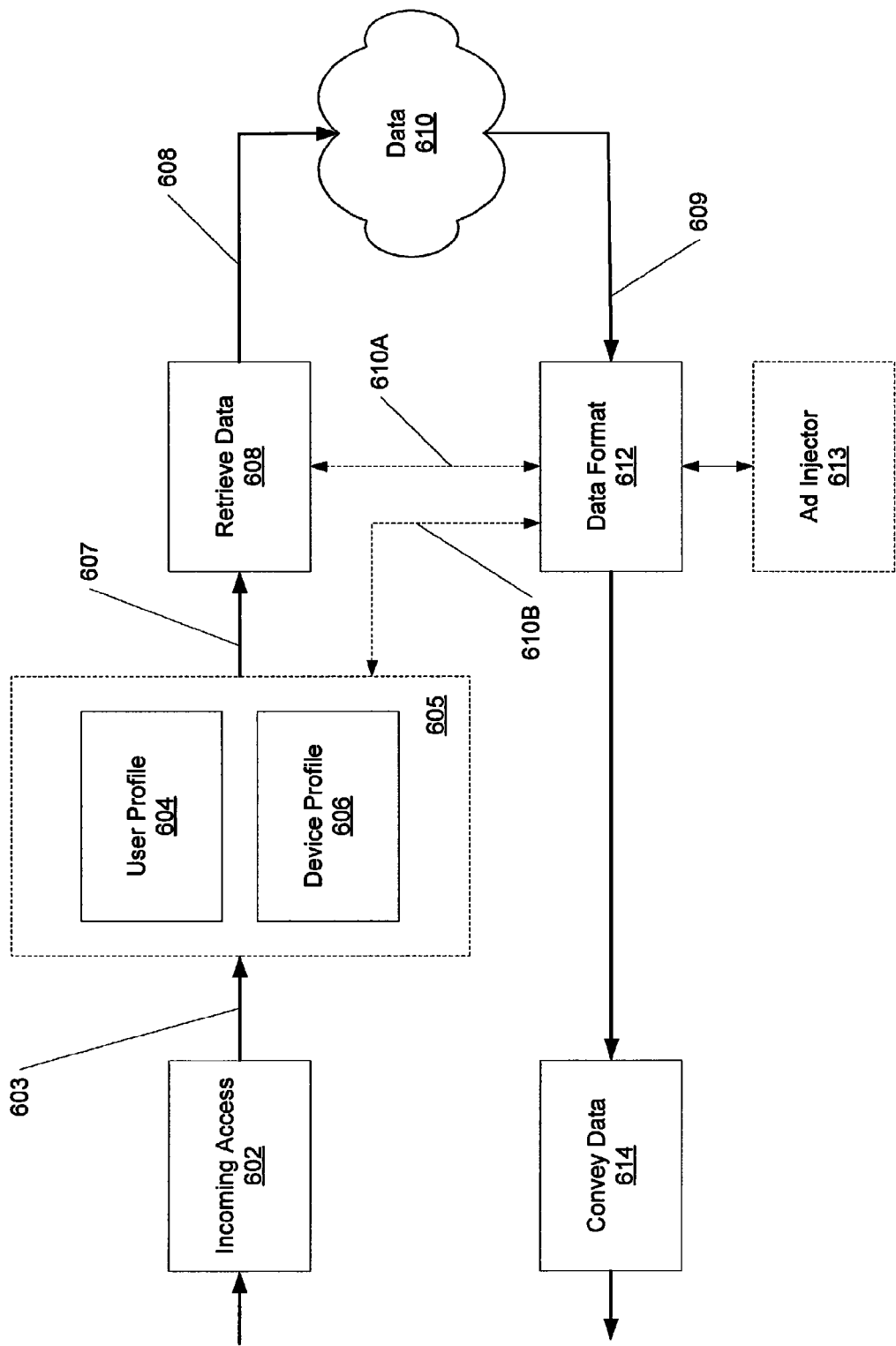
FIG. 6 illustrates one embodiment of a system for using user profiles.

FIG. 6 shows one embodiment illustrating the relationship access, profiles, and data retrieval. Other embodiments are possible and are contemplated. The elements described in FIG. 6 may be located in one or more locations. In the embodiment shown, an access from a remote device is received at a port or other mechanism 602 configured to receive accesses. The received access may include a request for data 603 which is conveyed to device 605. Device 605 may include any suitable hardware and/or software combination for servicing data requests. In the embodiment shown, device 605 includes user profile 604 and device profile 606. In Alternative embodiments, user profile 604 and device profile 606 may be located apart from device 605. In addition to including a request for data, the received access may also include an indication of the user making the request and the type of device being used to make the request. Device 605 may then utilize the user and device indications to select a corresponding user profile 604 and device profile 606, respectively.

Based on the corresponding profiles and the data request, device 605 may then formulate a specific data retrieval request 607. The device profile 606 may be used to select or format data which is suitable for the particular device. For example, if the device is text only, no graphic images will be conveyed in any response which is conveyed to the user device. Further, requested data which does not conform to the requirements of the device may be reformatted to a format which is suitable for the device. The user profile 604 may be used to select or format data in accordance with a profile or preferences of the accessing user. For example, in one embodiment the user profile 604 may be used to select an advertisement targeted to the particular user. Alternatively, the profile may indicate the user is a fan of a particular football team. Using this information, the device 605 may be configured to determine whether any news or scores concerning that team are available. This information may then be conveyed in conjunction with the requested data. Alternatively, an indication that this information is available may be conveyed to the user who may then decide whether they want the information conveyed to them. The user profile 604 may also include preferences indicating a specific presentation format the user has previously indicated. Numerous alternatives are possible and are contemplated.

Upon generating the data request, device 605 conveys the request 607 for retrieval of the data. In the embodiment shown, the request is conveyed via an optional port 608. Data 610 may be located in one or more local and/or remote locations. Retrieved data 609 is then formatted 612 as appropriate for the device and the transmission medium and conveyed 614 to the requesting device. Hardware and/or software device 612 is configured to communicate 610A-610B with other elements of the system as necessary to determine formatting requirements. In one embodiment, device 612 is coupled to advertisement injector 613 where advertisements targeted to the particular user may be obtained and included with the returned data. Accordingly, usage by a mobile or other remote unit may affect advertisements targeted to the user while watching television at home. Similarly, Web surfing activity may affect the data the user receives when making accesses using a wireless PDA. Ultimately, all user interaction with the system may affect the user profile which may in turn affect the information the user receives from any accessing device.

Various embodiments may further include receiving, sending or storing instructions and/or data implemented in accordance with the foregoing description upon a carrier medium. Generally speaking, a carrier medium may include transmission media or signals used in broadcast systems and otherwise such as electrical, electromagnetic, or digital signals, conveyed via a communication medium such as network and/or a wireless link. For example, a network operator may convey signals which describe program instructions via a broadcast system. Alternatively, conveyed signals may include one or more "triggers" which are configured to cause execution of program instructions. A carrier medium may also include storage media or memory media such as magnetic or optical media, e.g., disk, DVD or CD-ROM, volatile or non-volatile media such as RAM (e.g. SDRAM, RDRAM, SRAM, etc.), ROM, etc.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for utilizing a user profile in an interactive television system, the method comprising:
    updating a user profile responsive to a first user activity, the first user activity being initiated via a first device;
    initiating a second user activity, the second user activity being initiated via a second device which is different from the first device, wherein either
        (i) the first user activity is related to television viewing and the second user activity is unrelated to television viewing, or
        (ii) the first user activity is unrelated to television viewing and the second user activity is related to television viewing;
    accessing the user profile in response to the second user activity; and
    transmitting data to a user responsive to the second user activity, wherein the transmitted data is based at least in part on the user profile, and wherein the first user activity affects a content of said data transmitted to the user responsive to the second user activity.

2. The method as recited in claim 1, further comprising updating said user profile in response to said second user activity.

3. The method as recited in claim 2, further comprising selecting non-requested data based on said user profile and transmitting said non-requested data.

4. The method as recited in claim 3, wherein said non-requested data comprises an advertisement targeted to the user.

5. The method as recited in claim 1, wherein said first user activity comprises an activity related to television viewing and the first device comprises a television receiver, and said second user activity is performed via a remote device that does not utilize the television receiver.

6. The method as recited in claim 5 wherein said first user activity is via a set-top box, said remote device is a wireless mobile unit, and wherein said set-top box and mobile unit are configured to communicate with one another.

7. The method as recited in claim 3, further comprising detecting a physical location of the second device; and selecting the data to be transmitted at least in part on the physical location of the second device.

8. The method as recited in claim 5, wherein the remote device is selected from the group consisting of: a cellular phone, a personal digital assistant, a fixed unit, and a portable computer system.

9. The method as recited in claim 1, wherein said first user activity is performed via a remote device that does not utilize a television receiver, and said second user activity comprises an activity related to television viewing and the second device comprises a television receiver.

10. The method as recited in claim 1, further comprising:
    determining the type of said second device;
    accessing a device profile corresponding to the second device;
    formatting said data to correspond to said device profile prior to transmitting the data; and
    transmitting the data to the second device.

11. The method as recited in claim 10, further comprising storing the user profile at one or more of a television broadcast station, user set-top box, or other remote location configured to communicate within the system.

12. The method as recited in claim 1, further comprising updating the user profile in response to detecting a physical location of a user's location trackable mobile unit.

13. The method as recited in claim 1, wherein the user profile is based on data obtained in a passive manner, active manner, or both.

14. An interactive television system comprising:
    a remote unit;
    a set-top box; and
    a broadcast station coupled to convey a programming signal to the set-top box;
    wherein the system is configured to:
        update a user profile responsive to a first user activity, the first user activity being initiated via a first device corresponding to one of the remote unit and the set-top box;
        detect a second user activity, the second user activity being initiated via a second device corresponding to one of the remote unit and the set-top box, the second device being different from the first device, wherein either
            (i) the first user activity comprises an activity related to television viewing and the second user activity comprises an activity unrelated to television viewing, or
            (ii) the first user activity comprises an activity unrelated to television viewing and the second user activity comprises an activity related to television viewing;
        access the user profile in response to the second user activity; and
        transmit data responsive to the second user activity, wherein the transmitted data is based at least in part on the user profile, and wherein the first user activity affects a content of said data transmitted to the user responsive to the second user activity.

15. The system as recited in claim 14, wherein the system is configured to update the user profile in response to the second user activity.

16. The system as recited in claim 15, wherein the first device is the remote unit, said first user activity is via the remote unit and does not utilize the set-top box, and wherein the second device is the set-top box and the second user activity utilizes the set-top box.

17. The system as recited in claim 15, wherein the system is further configured to:
- determine the type of the second device;
- access a device profile corresponding to the second device;
- format the data to correspond to the device profile prior to transmitting the data; and
- transmit the data to the second device.

18. The system as recited in claim 17, wherein the user profile is stored at one or more of a television broadcast station, user set-top box, or other remote location configured to communicate within the television system.

19. The system as recited in claim 15, wherein the system is further configured to select non-requested data based on said user profile and transmit said non-requested data to a user.

20. The system as recited in claim 14, wherein the first device is the set-top box and the first user activity is performed via the set-top box, and wherein the second device is the remote unit and the second user activity is performed via the remote unit and does not utilize the set-top box.

21. The system as recited in claim 20 wherein said set-top box and remote unit are configured to communicate with one another.

22. The system as recited in claim 20, wherein the system is further configured to detect a physical location of the second device; and select the data to be transmitted at least in part on the detected location.

23. The system as recited in claim 20, wherein the remote device is selected from the group consisting of: a cellular phone, a personal digital assistant, a fixed unit, and a portable computer system.

24. The system as recited in claim 14, wherein the system is further configured to update the user profile in response to detecting a physical location of a user's location trackable mobile unit.

25. The system as recited in claim 14, wherein the user profile is based on data obtained in a passive manner, active manner, or both.

26. A computer readable storage medium comprising program instructions, or triggers to launch execution of program instructions, wherein the program instructions are executable by a computing device to:
- update a user profile responsive to a first activity, the first user activity being initiated via a first device;
- detect a second user activity, the second user activity being initiated via a second device which is different from the first device, wherein either
  - (i) the first user activity comprises an activity related to television viewing and the second user activity comprises an activity unrelated to television viewing, or
  - (ii) the first user activity comprises an activity unrelated to television viewing and the second user activity comprises an activity related to television viewing;
- access the user profile in response to the second user activity; and
- transmit data responsive to the second user activity, wherein the transmitted data is based at least in part on the user profile, and wherein the first user activity affects a content of said data transmitted to the user responsive to the second user activity.

27. The computer readable storage medium as recited in claim 26, wherein the first user activity is performed via a set-top box, and the second user activity is performed via the remote unit and does not utilize the set-top box.

28. The carrier medium as recited in claim 27, wherein the remote unit is selected from the group consisting of: a cellular phone, a personal digital assistant, a fixed unit, and a portable computer system.

29. The computer readable storage medium as recited in claim 26, wherein the program instructions are further executable to:
- determine the type of the second device;
- access a device profile corresponding to the second device;
- format the data to correspond to the device profile prior to transmitting the data; and
- transmit the data to the second device.

30. The computer readable storage medium as recited in claim 26, wherein the program instructions are executable to select non-requested data based on said user profile and transmit said non-requested data to a user.

31. The computer readable storage medium as recited in claim 26, wherein the program instructions are executable to select the data to be transmitted at least in part on the detected physical location of the second device.

32. The carrier medium as recited in claim 26, wherein the user profile is based on data obtained in a passive manner, active manner, or both.

* * * * *